United States Patent
Bachmann

[15] 3,691,881
[45] Sept. 19, 1972

[54] PIPE CUTTING APPARATUS

[72] Inventor: George Bachmann, 945 Metro Drive, Monterey Park, Calif. 91754

[22] Filed: March 29, 1971

[21] Appl. No.: 128,953

[52] U.S. Cl. .................................. 82/4 C, 82/76
[51] Int. Cl. ........... B23b 3/22, B23b 5/04, B23b 3/04
[58] Field of Search ....... 82/4 C, 70.2, 71, 72, 73, 74, 82/75, 76

[56] References Cited

UNITED STATES PATENTS

| | | | |
|---|---|---|---|
| 3,247,743 | 4/1966 | Frost et al. | 82/4 C |
| 2,753,739 | 7/1956 | Dreier | 82/4 C |
| 909,182 | 1/1909 | Hart | 82/4 C |

Primary Examiner—Harrison L. Hinson
Attorney—White, Haefliger & Bachand

[57] ABSTRACT

Apparatus for cutting pipe having inner and outer surfaces, comprises:

a. drive means engageable with one of said inner and outer surfaces for rotating the apparatus about the pipe, b. thrust exerting means engageable with the other of said inner and outer surfaces for urging the drive means toward said pipe, said thrust exerting means including individually adjustable rollers engageable with said other surface, c. support structure for said drive means and thrust exerting means, d. a first cutting tool and a head therefor carried by said support structure for movement toward and away from said other surface of the pipe, and e. other means including a spring to yieldably urge the head toward said other surface of the pipe so that the cutting tool may have yieldable cutting engagement with the pipe as the apparatus rotates about the pipe.

13 Claims, 9 Drawing Figures

INVENTOR.
GEORGE BACHMANN
BY
White, Haefliger & Bachand
ATTORNEYS.

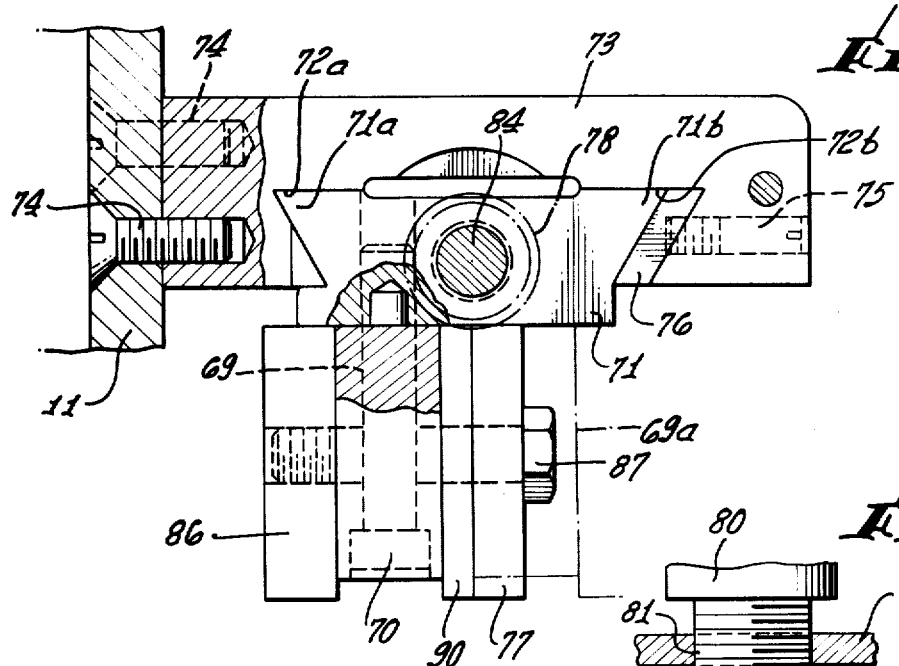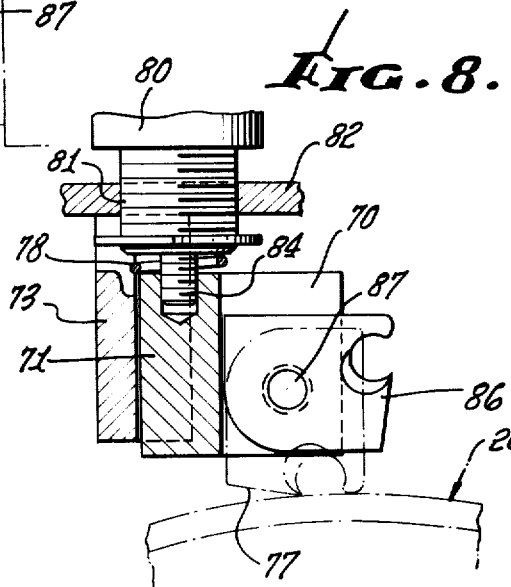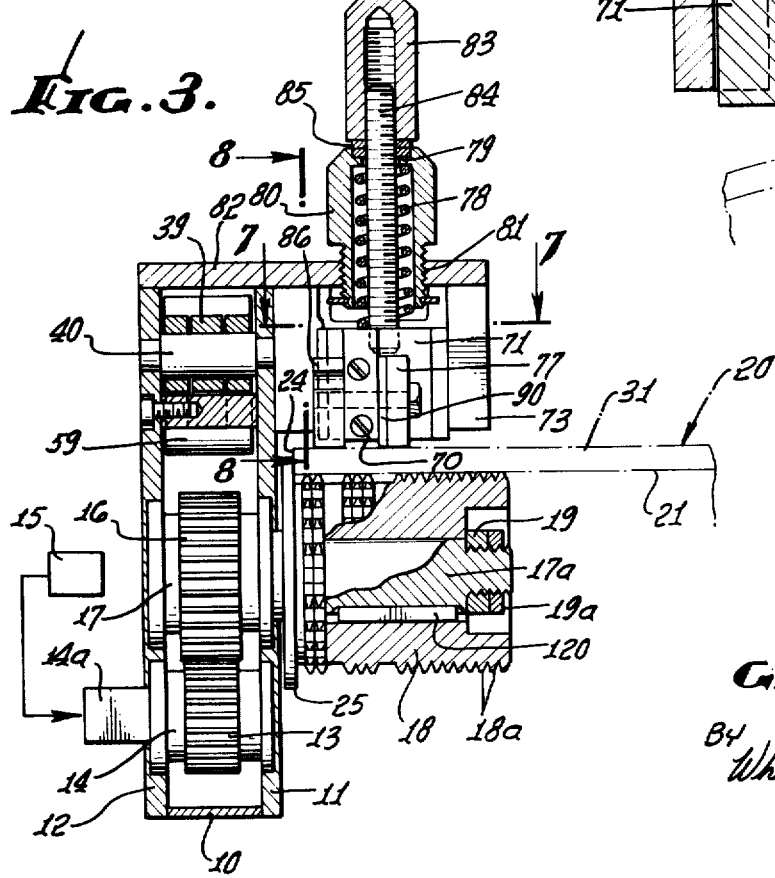

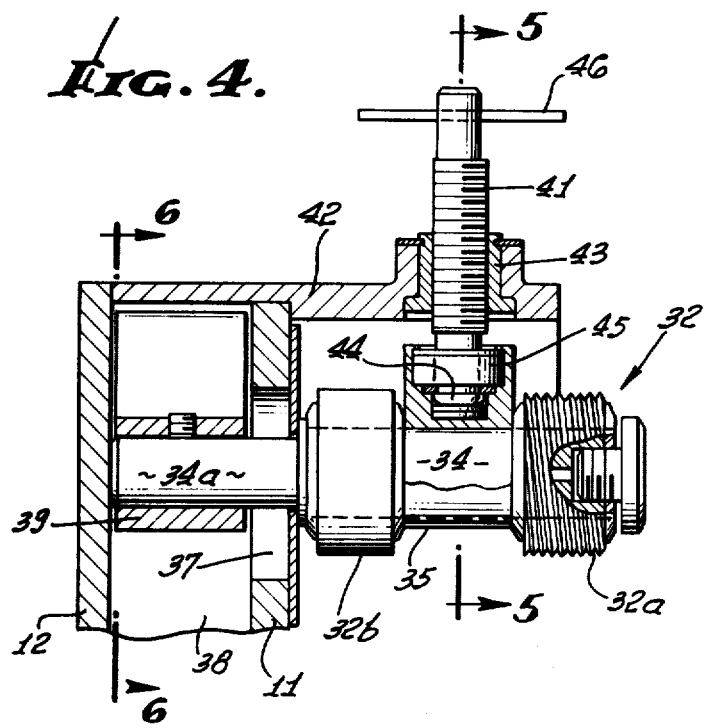
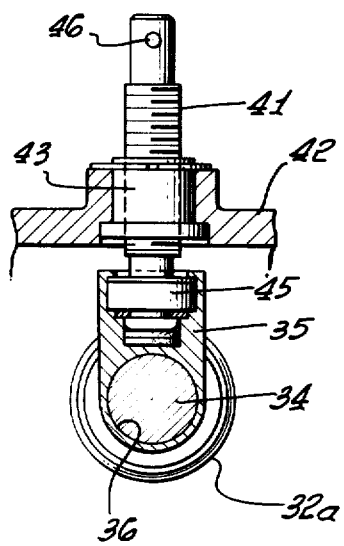
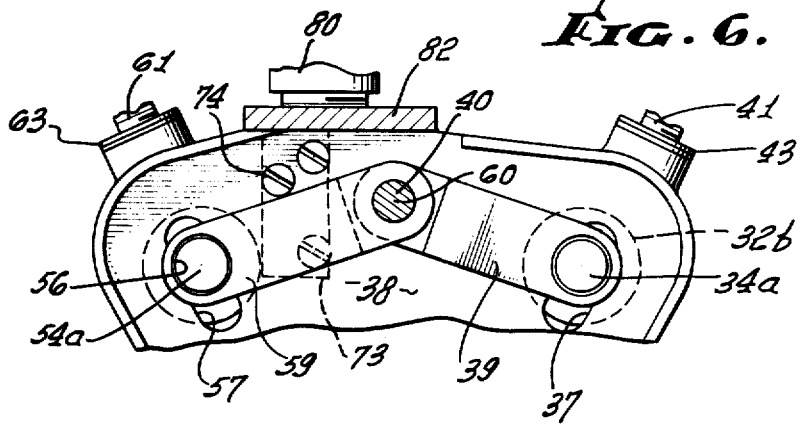
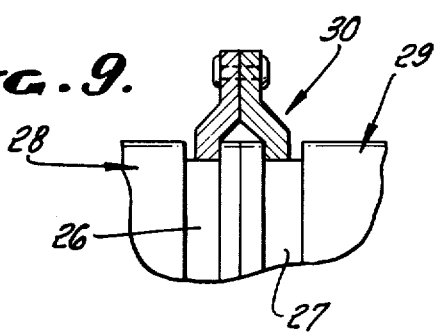
INVENTOR.
GEORGE BACHMANN
BY
White, Haefliger & Bachand
ATTORNEYS.

PIPE CUTTING APPARATUS

BACKGROUND OF THE INVENTION

This invention relates generally to apparatus for cutting pipe; more particularly, it concerns pipe grooving and cut-off apparatus of improved construction and mode of operation.

There is a need for easily operable and highly reliable equipment for grooving and/or cutting-off metallic pipe of a wide range of diameters, and which can be used on the jobsite. While attempts have been made in the past to meet this need, no apparatus of which I am aware embodies the unusually advantageous features of construction, modes of operation and beneficial results afforded by the present invention, as will be seen. Among these are the capacity for both grooving and cutting-off pipe, as optionally required; portability; spring loading and simultaneous adjustability of the cutter or cutters; integration of all feed and tension controls at one location; improved adjustable mounting of the tool on the pipe for rotation about the pipe during grooving; cutting rate control; capacity for location of the grooving tool at an adjustable distance from the end of the pipe; and additional advantages as will be seen.

SUMMARY OF THE INVENTION

It is a major object of the invention to provide pipe cutting apparatus embodying the above advantageous features, modes of operation and results. Basically, the apparatus comprises, in combination, drive means engageable with one of the inner and outer surfaces of the pipe (as for example, the inner surface) for driving the tool about the pipe; thrust exerting means including individually adjustable rollers engageable with the other pipe surface (as for example, the outer surface) for holding the drive means on the pipe, there being a body or support for the drive and the rollers; a first cutting tool and head therefor carried by the support structure for movement toward and away from the opposite surface of the pipe; and means including a spring to yieldably urge the head toward that other surface of the pipe so that the cutting tool may have yieldable cutting engagement with the pipe as the tool rotates relative to the pipe. In this regard, the tool may rotate about the pipe axis.

More specifically, a second cutting tool may be carried by the head for alternate cutting presentation to the pipe, and the cutters may respectively comprise a groove cutter and a pipe cut-off element; the spring may be supported by a first carrier for adjustable movement toward and away from the pipe to control spring force transmission to the cutting tool; a second carrier may be operatively connected with the head for adjustable movement displacing the head toward and away from the pipe while the spring continues to urge the head toward the pipe; the thrust exerting means may comprise pairs of rollers engageable with the pipe outer surface, and holders for the roller pairs individually controllably movable along arcuate paths to advance and retract the rollers generally normal to the pipe surface; certain rollers may be peripherally grooved to urge the support structure endwise toward the pipe end; and there may be provision for adjustable spacing of groove cutting from the pipe end.

These and other objects and advantages of the invention, as well as the details of an illustrative embodiment, will be more fully understood from the following description and drawings, in which:

DRAWING DESCRIPTION

FIG. 3 is a section taken in elevation on lines 3—3 of FIG. 2;

FIG. 4 is a section taken on lines 4—4 of FIG. 2;

Figure 1:
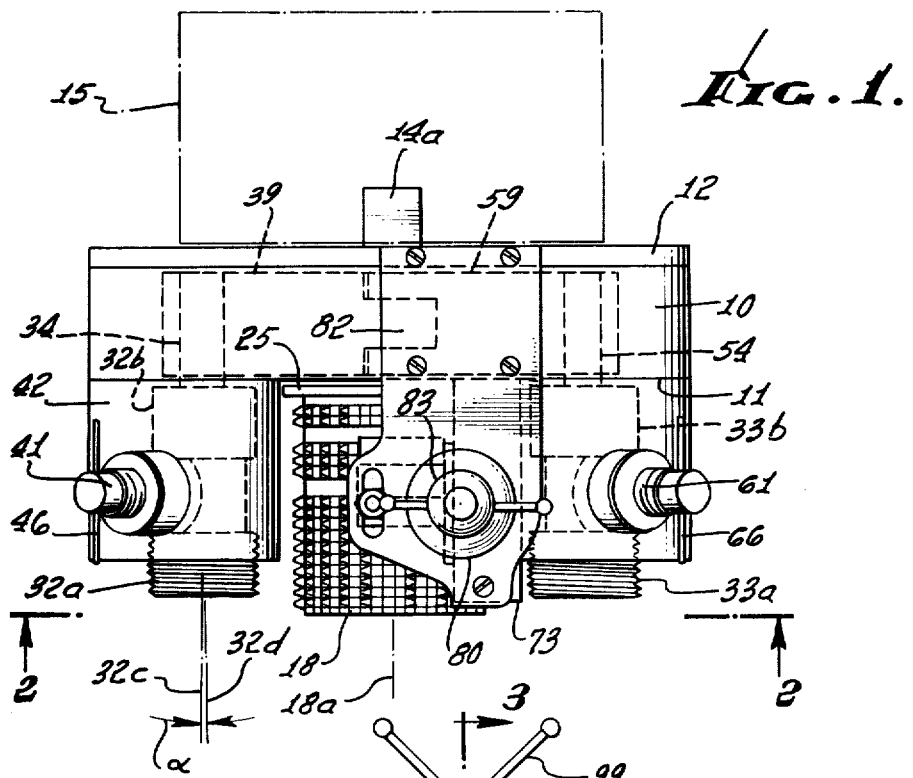
FIG. 1 is a top plan view of apparatus incorporating the invention.

FIGS. 5 and 6 are sections taken on lines 5—5 and 6—6 respectively of FIG. 4;

FIG. 7 a horizontal section taken on line 7—7 of FIG. 3;

FIG. 8 is a vertical section taken on lines 8—8 of FIG; 3; and

FIG. 9 illustrates two grooved pipes retained in end-to-end relation.

DETAILED DESCRIPTION

In the drawings, a support structure may, for example, include a body 10 and vertically extending, horizontally spaced, front and back cover plates 11 and 12. Drive means carried by the support structure may typically include a spur gear 13 attached to shaft 14 projecting at 14a for driven connection with a rotary power source 15; a larger spur gear 16 (for speed reduction) meshing with gear 13 and carried by shaft 17; and pipe engaging roller 18 carried and driven by shaft extension 17a. Two nuts 19 and 19a threaded on extension 17a retain the roller 18, and a key 20 interconnects the roller and the extension 17a.

Roller 18 may typically be serrated or toothed at 18a to positively grip and drive one surface (as for example, inner surface 21) of a pipe 20 to be subjected to grooving and/or cutting. As will be explained, when the tool is rotated about the pipe by the roller 18, for example, in the direction of arrow 23 in FIG. 2, a stop flange 25 carried on the roller 18 or shaft 17 is urged relatively against pipe end 24. This enables accurate spacing, from the end 24 of the pipe, of the groove cut in the pipe wall by the tool. FIG. 9 shows two such grooves 26 and 27 formed in adjacent pipes 28 and 29 held in end-to-end relation by a suitable coupling 30.

Figure 2:
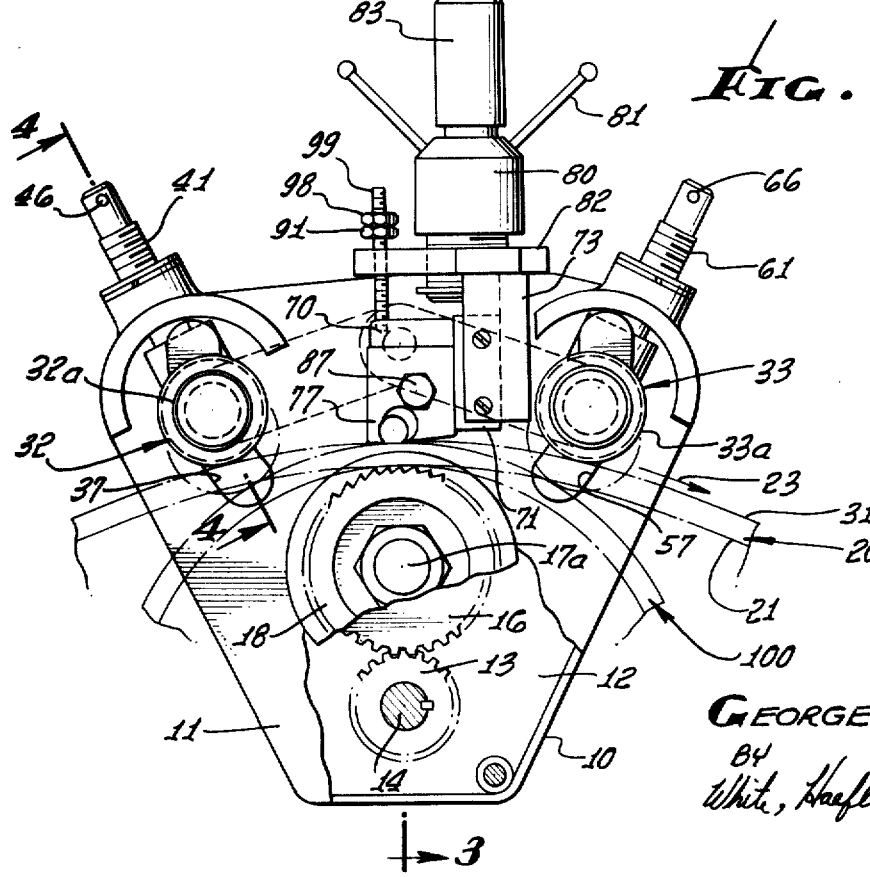
FIG. 2 is a front elevation taken on line 2—2 of FIG. 1.

Also provided is what may be generally referred to as thrust exerting means engageable with the pipe opposite surface (as for example, outer surface 31) for urging the drive roller toward and into engagement with the pipe. The illustrated thrust exerting means includes a pair of guide roller units 32 and 33 engageable with the pipe outer surface as best seen in FIG. 2, and holders for these roller units movable on and relative to the support structure along arcuate paths to advance and retract the rollers generally normal to the pipe outer surface.

More specifically, and as seen in FIGS. 4–6, the roller unit 32 includes rollers 32a and 32b integral with a common shaft 34. A holder yoke 35 between the rollers contains a bore 36 to closely receive the shaft 34 for displacing same along the described arcuate path defined by the arcuate guide slot 37 in plate 11. An extension 34a of the shaft passes through the slot, and projects into the body interior 38 for pivotal connection to link 39. The latter swings about pivot hinge 40 to support shaft 34 and the rollers 32a and 32b for arcuate movement as described, pivot hinge 40 being supported by plates 11 and 12. Such movement is controlled as by the feed screw 41 carried by body projection 42. The screw has connection to a threaded sleeve 43; and its lower terminal 44 is rotatably connected at 45 to the holder so that when the handle 46 on the screw shaft upper end is rotated, the holder 35 and rollers 32a and 32b are displaced along the arcuate path defined by slot 37, or by swinging of link 39.

Similarly, the roller unit 33 includes rollers 33a and 33b integral with a common shaft 54. A holder yoke 55 between these rollers contains a bore 56 to closely receive the shaft 54 for displacing same along the described arcuate path defined by guide slot 57 in plate11. An extension 54a of the shaft passes through the slot and projects into the body interior 38 for pivotal connection to link 59. The latter also swings about pivot hinge 40 to support the shaft 54 and the rollers 33a and 33b for arcuate movement as described. A feed screw 61 also carried by body projection 42 controls the swing of the holder 55 and rollers 33a and 33b about hinge axis 60, which is generally parallel to the axis of the pipe 22 to be grooved. Screw 61 has connection to the interiorly threaded sleeve 63; and its lower terminal is rotatably connected with a holder similar to holder 35, so that when handle 66 on the screw shaft upper end is rotated, the associated holder and rollers 33a and 33b are displaced along the arcuate (circular) path defined by slot 57, or by swinging of link 59.

It will be noted that each of the rollers 32a and 33a has surface grooving which extends circumferentially about the roller. Such grooving is angled, or spiraled, to engage and urge the support structure endwise toward the pipe, and specifically the support structure comprises the stop flange 25 previously described. This occurs in response to roller rotation as effected by turning of drive roller 18 urged into gripping engagement with the pipe interior surface by the rollers 32a, 32b, 33a and 33b forced against the pipe exterior surface. The use of two sets of roller pairs as described stabilizes or "squares" the tool relative to the pipe and its end 24, whereby an accurately located groove may be cut with uniform depth. Positive urging of the stop flange toward the pipe end may also be aided by very slight angling of one of the roller axes 32c and 33c out of parallel with the axis 18a of the drive roller 18, as best seen in FIG. 1. The illustrated divergent angle $\alpha$ is about ½°. Line 32d is parallel to axis 18a.

Also provided is a cutting tool head or post 70 guided for movement toward and away from the pipe 22, as by the dove-tail corners 71a and 71b on a slide 71, which have slide interfit in the dove-tail recesses 72a and 72b formed in support 73. The latter is attached to the plate 11, as by the fasteners 74.

In this regard, the post 70 may be locked in any selected up and down position as by tightening the set screw 75 which urges an angled gib 76 laterally against the slide, as seen in FIG. 7. Post 70 may be fastened as at 69 to the slide. Alternatively, the post may be fastened in broken line position 69a to the slide, for grooving only. (i.e., without cut-off.)

Means is provided to yieldably urge the slide and post, as well as cutting tool 77 carried by the post, toward the pipe. Such means is shown to include a compression spring 78 the lower end of which engages and urges the slide downwardly, and the opposite or upper end of which engages a shoulder 79 on a first carrier 80 in the form of a sleeve. The latter had threaded engagement at 81 with a plate 82 integral with the body 10, so as to support the upper end of the spring for movement toward and away from the pipe, thereby to vary the spring compression and downward force exertion on the slide. As will be seen, the spring generates the force yieldably urging the cutter against the pipe, and this force may be varied by rotating the first carrier 80. For this purpose, the carrier may be provided with a handle 81.

A second carrier, as for example, may comprise rotor 83, is operatively connected with the post 70 and carried by the first carrier sleeve 80 for adjustable movement displacing the post toward and away from the pipe while spring 78 continues to urge the head and cutter 77 toward the pipe. Carrier rotor 83 is shown as a sleeve having internal threaded connection with the upper portion of a feed screw 84, the lower end of which is attached to slide 71. When rotor sleeve 83 is turned, as by means of handle 99 to retract the screw and also the slide 71, post 70 and cutter 77 away from the pipe, the spring force exerted on the slide is transmitted via the screw to the rotor 83 and urges it into engagement with a thrust bearing 85 on the carrier 80; conversely, when the rotor 83 is turned in the opposite rotary direction to advance the screw 84 and therefore the cutter 77 toward and into engagement with the pipe, the spring force is transferred to the cutter. Such transfer can be determined by observing the disengagement of rotor 83 from the thrust bearing. Accordingly, accurate control of cutting force application generated by a heavy-duty spring is realized, for rapid and accurate pipe cutting.

Selective cutting, as for example, grooving and/or cutting-off, is also enabled by the invention. For this purpose, reference is made to FIG. 8 showing the manner in which cutter 77 remains presented downwardly to the pipe at all times, whereas a second cutter 86 is selectively swingable about pivot 87 on post 70 downwardly toward the pipe. In the latter event, cutter 86 projects downwardly to greater extent than cutter 77, so that cutter 86 is operable rather than cutter 77. In this regard, cutters 77 and 86 may respectively groove the pipe, and cut-through a pipe section, as the pipe rotates. Pivot 87 may comprise a threaded fastener which may be tightened to hold cutter 86 in swing-down position.

Finally, a selected thickness spacer 90 may be inserted between groove cutter 77 and the post 70 to space the groove cutter at a selected distance from the end 24 of the pipe. Accordingly, control of the groove spacing from the pipe end is afforded.

Reference to FIG. 2 will also show the wide range of sizes of pipe that may be grooved or cut-off, by means of the present invention. Two such larger and smaller pipes are indicated at 20 and 100.

In operation, the apparatus is mounted on a pipe as shown on FIG. 3, and the roller units 32 and 33 are individually adjusted to clamp the pipe inner wall against the drive roller or cylinder 18. At this time, the post 70 may be in retracted position. Next, the carrier 83 is rotated to advance the cutter downwardly into engagement with the pipe, and the carrier is further turned to back away from thrust bearing 85. In this regard, the extent of such back-off may be used to control the depth of grooving, the carrier 83 re-engaging the thrust bearing to limit further cutting when the desired depth is achieved. Normally, however, an adjusting nut 91 on a threaded stud 99 carried by post 70 is used to limit depth of cut by engagement with the top of plate 82. For this purpose, stud 99 may project through an opening in that plate, as shown. Locking nut 98 locks adjusting nut 91 in selected position. Next, the cylinder 18 is rotated to effect pipe relative rotation and cutting.

It should also be noted that provision for individual adjustability of advancement of the roller pairs 32 and 33 toward and against the pipe serves as a means to control the angle of attack of the operative or selected cutter relative to the pipe, for cutting rate control. Thus, in FIG. 2, if rollers 33 are advanced toward the pipe and rollers 32 retracted, the cutting edge 90 will have a larger angle of attack relative to the pipe outer surface.

The spring 78 tends to prevent jamming due to the fact that the cutter and post 70 are able to move outwardly relative to the pipe and against spring compression should cutting resistance approach drive force transmitted to the pipe by the roller 18. Rollers 32 and 33 may then be adjusted to decrease the cutter angle of attack, to relieve the jamming tendency.

I claim:

1. In apparatus for cutting pipe having inner and outer surface, the combination comprising
   a. drive means engageable with one of said inner and outer surfaces for rotating the apparatus about the pipe,
   b. thrust exerting means engageable with the other of said inner and outer surfaces for urging the drive means toward said pipe, said thrust exerting means including individually adjustable rollers engageable with said other surface,
   c. support structure for said drive means and thrust exerting means,
   d. a first cutting tool and a head therefor carried by said support structure for movement toward and away from said other surface of the pipe, and
   e. other means including a spring to yieldably urge the head toward said other surface of the pipe so that the cutting tool may have yieldable cutting engagement with the pipe as the apparatus rotates about the pipe.

2. The combination of claim 1 including a second cutting tool carried by the head, said tools having positions of alternate cutting presentation to the pipe.

3. The combination of claim 2 wherein one of said tools comprises a groove cutter.

4. The combination of claim 3 wherein the other of said tools comprises a pipe cut-off tool.

5. The combination of claim 2 including means pivotally supporting said tools on the head for said alternate presentation to the pipe.

6. The combination of claim 1 wherein said other means includes a first carrier to support the spring for adjustable movement toward and away from the pipe.

7. The combination of claim 6 wherein said other means includes a second carrier operatively connected with the head and carried by the first carrier for adjustable movement displacing the head toward and away from the pipe while the spring continues to urge the head toward the pipe.

8. The combination of claim 1 including said pipe the inner surface of which is engaged by the drive means of the outer surface of which is engaged by the thrust exerting means.

9. The combination of claim 1 wherein said thrust exerting rollers are carried by holders movable on nd relative to said support structure along arcuate paths to advance and retract the rollers generally normal to the pipe outer surface.

10. The combination of claim 9 wherein one of said rollers has surface grooving angled to urge the apparatus endwise toward the pipe end in response to rotation of the apparatus about the pipe.

11. The combination of claim 9 wherein said thrust exerting means includes manually actuable elements independently adjustable to displace said holders along said paths.

12. The combination of claim 1 including a removable and selected width spacer carried by the head to space the cutting tool at a selected distance from the pipe end.

13. The combination of claim 9 including pivoted links swingably supporting said holders for movement along said arcuate paths which are circular.

* * * * *